United States Patent [19]

Johnsgard

[11] Patent Number: 4,986,838
[45] Date of Patent: Jan. 22, 1991

[54] INLET SYSTEM FOR GAS SCRUBBER

[75] Inventor: Mark W. Johnsgard, Campbell, Calif.

[73] Assignee: Airgard, Inc., Campbell, Calif.

[21] Appl. No.: 365,887

[22] Filed: Jun. 14, 1989

[51] Int. Cl.⁵ .................... B01D 45/16; B01D 47/16
[52] U.S. Cl. ...................................... 55/223; 55/238; 55/240; 55/248; 55/260
[58] Field of Search .......... 55/223, 227, 235, 237–240, 55/248, 260; 261/153

[56] References Cited

U.S. PATENT DOCUMENTS

| | | | |
|---|---|---|---|
| 1,980,522 | 11/1934 | Hawley | 55/223 |
| 2,200,891 | 5/1940 | Nyborg | 55/223 |
| 2,259,032 | 10/1941 | Fisher | 55/235 X |
| 2,281,254 | 4/1942 | Anthony | 261/79 |
| 2,396,526 | 3/1946 | Nilsson | 55/238 X |
| 2,545,028 | 3/1951 | Haldeman | 261/153 |
| 2,585,440 | 2/1952 | Collins | 55/227 X |
| 3,138,441 | 6/1964 | Krantz | 55/240 X |
| 3,338,029 | 8/1967 | Warfield, Jr. | 55/260 X |
| 3,358,413 | 12/1967 | Kalika | 55/238 X |
| 3,439,724 | 4/1969 | Mason | 55/223 X |
| 3,524,631 | 8/1970 | Mare | 55/223 X |
| 3,567,194 | 3/1971 | Shah et al. | 261/DIG. 54 |
| 3,582,051 | 6/1971 | Klein et al. | 55/223 X |
| 3,620,510 | 11/1971 | Longore | 261/79 |
| 3,638,925 | 2/1972 | Braemer | 261/DIG. 54 |
| 3,722,185 | 3/1973 | Miczek | 55/238 |
| 3,768,234 | 10/1973 | Hardison | 55/227 X |
| 3,841,061 | 10/1974 | Pike | 55/223 |
| 3,907,526 | 9/1975 | Saleem et al. | 55/223 |
| 3,933,450 | 1/1976 | Percevaut | 55/223 |
| 3,989,488 | 11/1976 | Wisting | 55/238 |
| 3,990,870 | 11/1976 | Miczek | 55/238 X |
| 4,388,089 | 6/1983 | Reif et al. | 55/238 X |
| 4,469,493 | 9/1984 | Tuovinen et al. | 55/235 X |
| 4,529,418 | 7/1985 | Reif et al. | 55/238 X |
| 4,578,226 | 3/1986 | Adlhoch et al. | 261/DIG. 54 |
| 4,643,742 | 2/1987 | Hammarskog | 55/223 X |

FOREIGN PATENT DOCUMENTS

| | | | |
|---|---|---|---|
| 670150 | 9/1963 | Canada | 55/235 |
| 1457183 | 12/1970 | Fed. Rep. of Germany | 55/223 |
| 2452311 | 11/1980 | France | 55/238 |
| 740265 | 6/1980 | U.S.S.R. | 55/237 |
| 1295735 | 11/1972 | United Kingdom | 55/223 |

*Primary Examiner*—Robert Spitzer
*Attorney, Agent, or Firm*—Rosenblum, Parish & Bacigalupi

[57] ABSTRACT

An effluent gas scrubbing system is disclosed having an improved scrubber inlet system including a transition tube having a fluted lower portion for directing particulate carrying gas into the mist saturated scrubbing chamber of a gas scrubber, a fluid reservoir affixed to the upper portion of the transition tube and having a plurality of fluid supply jets tangentially positioned along internal cavity forming walls of the reservoir so as to cause the fluid within the internal cavity of the reservoir to swirl, and a readily interchangeable gas inlet pipe which is co-axially positioned within the cavity and with respect to the transition tube so as to create a transition gap between the transition tube and the inlet pipe through which a swirling flow of fluid may exit the cavity and enter the upper portion of the transition tube so as to thoroughly coat the entire length of the transition tube with fluid, and so as to provide a smooth and abrupt transition between the dry-walled inlet pipe and the wet-walled transition tube.

19 Claims, 5 Drawing Sheets

INLET SYSTEM FOR GAS SCRUBBER

BACKGROUND OF THE INVENTION

1. Field of the Invention

The present invention relates generally to effluent scrubbers and more particularly to an improved scrubber inlet system for use with effluent scrubbers.

2. Brief Description of the Prior Art

In the semiconductor industry, exhaust gas scrubbers are used to cleanse the unreacted silicon gases that are exhausted from silicon deposition systems. These gas scrubbers typically operate by passing the exhausted gas through an environment permeated with a misted or atomized fluid, such as water, which reacts with the unreacted particles in the gas to form solid deposits which rain from the gas into a collection reservoir.

Cross-sectional views of prior art gas scrubbers having elements similar to some of the gas scrubber models manufactured by Shannon, Inc. and Airprotek, Inc. are illustrated in FIGS. 1a and 1b, respectively. Both of these scrubbers cleanse the silicon gas exhausted from the deposition system by reacting it with water from one or more scrubbing jets, so as to form solid Silicon Dioxide ($SiO_2$).

The problem with these types of silicon gas scrubbers is that an $SiO_2$ coating is constantly being formed within the inlet pipe and unwashed walls of the scrubbing chamber. For example, in both FIGS. 1a and 1b, gas 1 passes through the inlet pipe 2 into the open area or transition region 3, where some of the gas mixes with the fluid mist 4. Silicon gas 1, which has mixed with fluid mist 4, is then carried by gas turbulence 7 and diffusion back-up and deposited on the insufficiently washed inner walls of the scrubbing chamber, so as to form a build-up 5. This $SiO_2$ build-up results in a significant problem which, until the present invention, remained unsolved.

As is shown in FIGS. 1a and 1b, the build-up of $SiO_2$ results in the development of restrictions in the inlet flow pipe, as well as other places. These restrictions develop because the transition region between the inlet pipe and the scrubbing spray are dampened sufficiently so as to cause the silicon gas to react, but are insufficiently washed so as to prevent build-up. The transition region and inlet pipe are dampened for two reasons: first, because water mist from the scrubbing jet 6 is diffused back into the transition region 3 and entry pipe 2; and second, because an abrupt volume change occurs as gas exits the narrow inlet pipe and enters the large scrubbing chamber, thereby creating heavy gas turbulence 7 and causing water mist and precipitated solids to be swept back into the inlet pipe and onto the walls of the transition region.

The resulting restrictions cause back-pressure to be created in the reaction chamber of the silicon deposition system from which the gas is exhausted. Excessive back-pressure will result in loss of process control and require the deposition system to be shut down until the restriction can be removed. Silicon gas scrubbers presently require restriction removal between every 1 to 5 days, depending on specific conditions.

Restriction removal is performed by shutting the deposition system down, flushing the system and the scrubber out with nitrogen gas to make the surrounding environment safe to humans, unscrewing an access union 8 (FIG. 1b), mechanically plunging out the build-up, rinsing the inlet port with water, and then re-tightening the access union. In all, the average downtime for restriction removal is about 35 minutes: 10 minutes for a nitrogen gas pre-purge, 15 minutes devoted to the actual cleaning process, and 10 minutes for a nitrogen gas post-purge. At the present time, silicon deposition system downtime typically costs over $500.00 per hour.

One possible, but not completely effective, means of avoiding the solidification of $SiO_2$ in the inlet port would be to use a venturi-type scrubbing system instead. Venturi scrubbers operate by passing uncleaned gas through a venturi and spraying or injecting water into the gas flow, thereby causing the solid particles in the gas to be impacted by the faster moving water droplets. This gas and water mixture is then passed into a cyclone or other apparatus which separates the dust-laden water droplets from the gas. The rapid and violent mixing of gas and fluid in venturi scrubbers, to some extent, helps to limit the amount of unclean gas which is exposed to unflushed walls.

Some examples of venturi-type scrubbers are shown in U.S. Pat. Nos. 3,620,510; 3,567,194; 3,638,925; 3,841,061; and 4,578,226. In these types of venturi scrubbers, the injected fluid is primarily used to scrub the incoming gas when forced through the venturi, and the fluid is given a rotational effect to improve the balance of the fluid/gas mixture. Since the overall purpose of a venturi scrubber is to inject cleaning fluid into the gas flow, no attempt is made by these scrubbers to introduce a mist free flow of fluid into the venturi. In addition, venturi scrubbers are generally not suitable for scrubbing silicon gas exhausted from silicon deposition systems because they develop restrictions rapidly and the venturi effect can adversely affect air pressure stabilization within the reaction chamber.

There are a number of other types of effluent gas scrubbing devices which utilize a centrifugal flow of fluid or gas to accomplish the scrubbing operation or to prevent particle adherence to internal surfaces of the scrubber. For example, U.S. Pat. No. 3,722,185, issued to Miczek, discloses a scrubber where water flows down the scrubbing chamber as a concentric sheet and tangentially introduced gas flows up the chamber in a helical path, such that dust particles, driven by centrifugal forces, are forced into the sheet of water and carried away. Use of a swirling sprayer within the scrubbing chamber (see FIG. 2) is disclosed in U.S. Pat. No. 2,281,254.

Another type of gas scrubber which uses a rotating film of fluid is the electro-inertial precipitator unit disclosed in Reif et al., U.S. Pat. No. 4,529,418. Reif et al disclose injecting a fluid film onto the inner surface of a collector tube through which gas passes. Electrostatic and centrifugal forces operating on the gas passing down the tube cause the dust particles within the gas to mix with the liquid and be washed away.

A system which is structurally similar to the present invention, but related to a non-analogous art, is the falling film heat exchanger disclosed in U.S. Pat. No. 2,545,028, issued to Haldeman. Haldeman discloses a heat exchanger in which a film of fluid adhering to the inlet pipe surface is used to absorb and retransmit heat between either two liquids, or a gas and a liquid, or perhaps even two gases. This patent does not concern itself with scrubbing uses, and is apparently not intended to prevent build-up of condensed material at the lower end of the inlet tube 17, (see FIG. 5).

SUMMARY OF THE PRESENT INVENTION

List of Objectives

It is therefore a primary objective of the present invention to provide an effluent gas scrubber system which minimizes the rate of restriction due to solid precipitate build-up and reduces inlet port cleaning time when restrictions do occur.

Another objective of the present invention is to provide an improved scrubber inlet system which creates an abrupt, mist-free, dry-to-wet transition between the dry incoming gas plumbing and the wet, completely flushed walls of the scrubbing chamber.

Another objective of the present invention is to provide an improved scrubber inlet system which minimizes gas turbulence in the stream of incoming gas, thereby minimizing the transport of moisture back up into the dry-to-wet transition region.

Another objective of the present invention is to isolate the dry-to-wet transition region from the mist producing nozzles of the scrubbing chamber by means of a water coated transition tube, thereby eliminating the diffusion of mist as a source of moisture in the dry, unflushed incoming gas pipes.

Another objective of the present invention is to provide an effluent gas scrubber system with a readily interchangeable gas inlet pipe.

Briefly, a preferred embodiment of the present invention comprises an effluent gas scrubber having an improved scrubber inlet system including a transition tube having a fluted lower portion for directing precipitate carrying gas into a well flushed initial scrubbing chamber of the gas scrubber, a fluid reservoir affixed to the upper portion of the transition tube and having a plurality of fluid supply jets tangentially positioned along internal cavity forming walls of the reservoir so as to cause the fluid within the internal cavity of the reservoir to swirl, and a readily interchangeable gas inlet pipe which is co-axially positioned within the cavity and with respect to the transition tube so as to create a transition gap between the transition tube and the inlet pipe through which a swirling flow of fluid may exit the cavity and smoothly enter the upper portion of the transition tube without breaking its surface tension and thereby thoroughly coating the entire length of the transition tube with fluid, and so as to provide a smooth and abrupt transition between the dry-walled inlet pipe and the wet-walled transition tube.

List of Advantages of the Invention

An important advantage of the present invention is that it minimizes the rate of restriction build-up in the transition region and the inlet pipe, thereby reducing the number of required reactor shutdown periods for maintenance by typically a factor of 10 or more.

Another advantage of the present invention is that it simplifies the cleaning process of the inlet pipe, thereby reducing the length of shutdown periods when maintenance is required.

These and other objects and advantages of the present invention will no doubt become apparent to those skilled in the art after having read the following detailed description of the preferred embodiment, contained in and illustrated by the various drawing figures.

DESCRIPTION OF THE PREFERRED EMBODIMENT

Figure 1A:
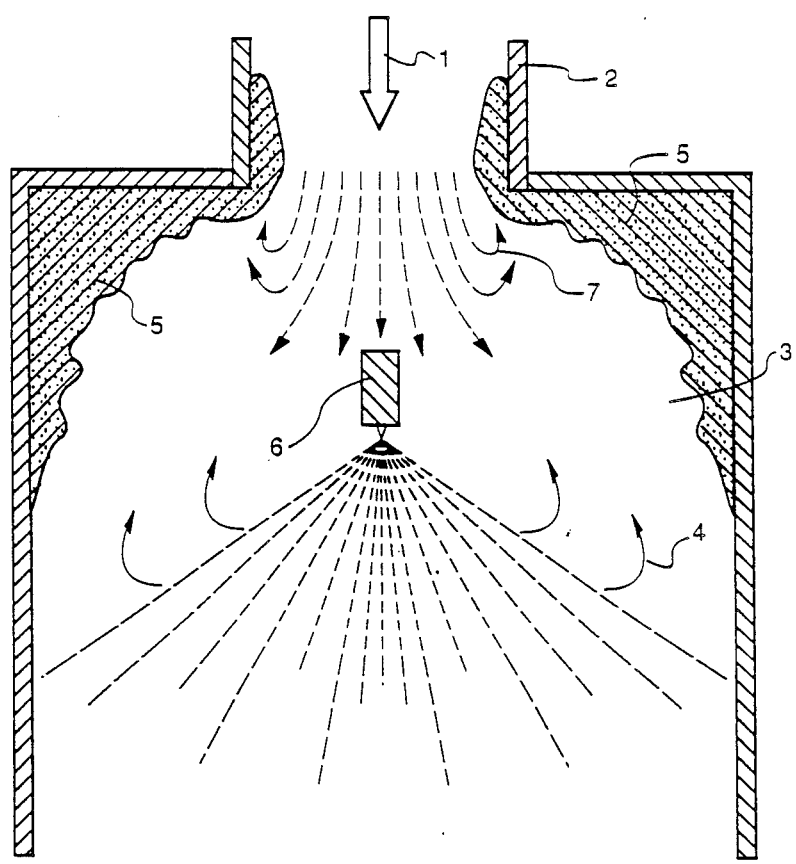
FIGS. 1a and 1b are cross-sectional views of prior art effluent gas scrubbers.
Figure 1B:
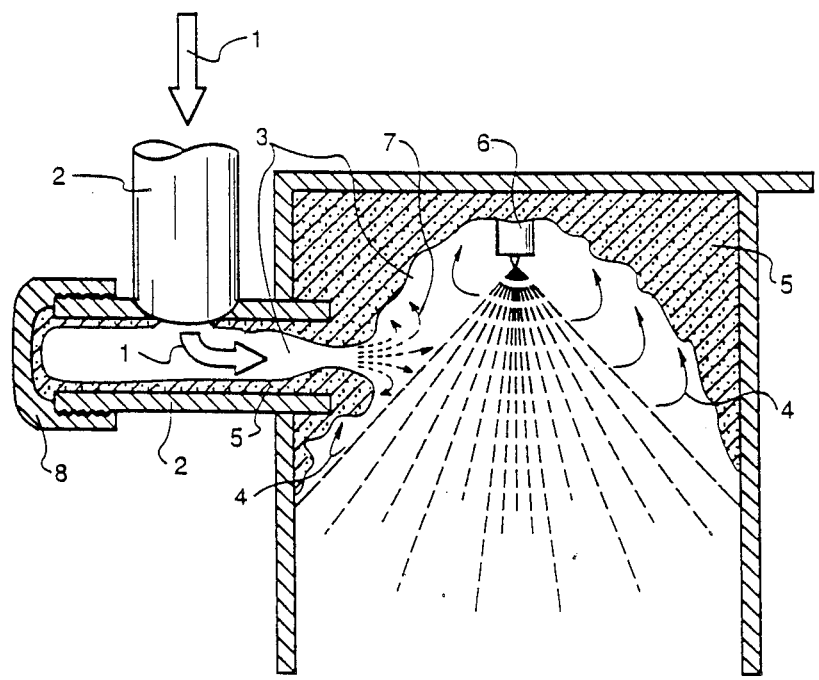
Figure 2:
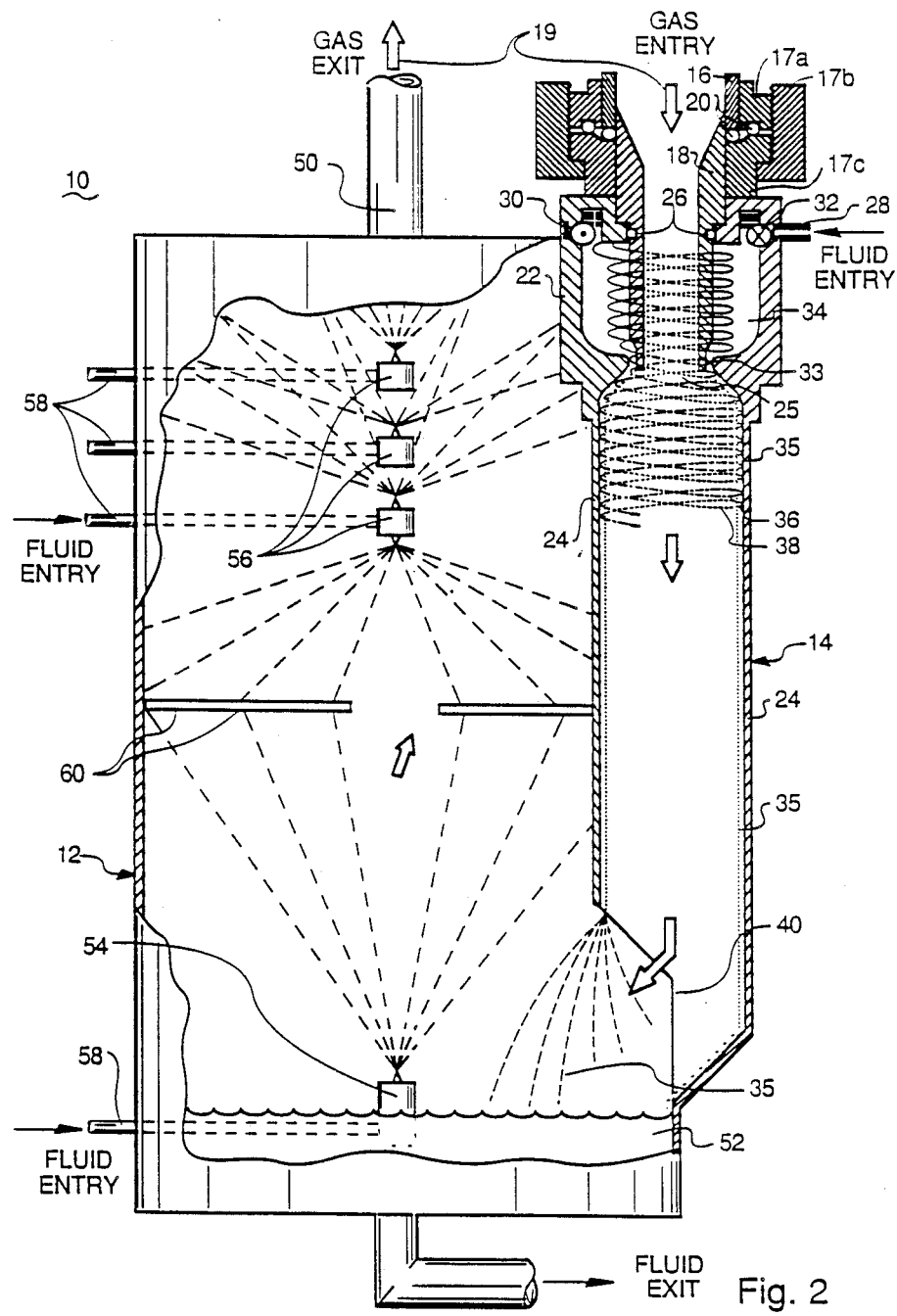
FIG. 2 is a partially-broken, partially cross-sectioned, elevational view of an effluent scrubbing system in accordance with the preferred embodiment of the present invention.

FIG. 2 illustrates an effluent scrubbing system, shown generally at 10, in accordance with the preferred embodiment of the present invention. The scrubbing system is comprised of two main components, the scrubbing chamber shown generally at 12 and the scrubber inlet system shown generally at 14. Although the preferred embodiment of the present invention is ideally suited for use in the semiconductor industry, it also has application in any industry where the cleansing of effluent gas is required.

During the silicon deposition process used to create semiconductors, layers of silicon are deposited onto wafers by injecting silicon gas over the wafers at high temperature. Reacted silicon gas is deposited on the wafer and unreacted silicon gas is passed out of the reaction chamber's exhaust, where it is treated by an effluent scrubber before being released to the atmosphere. Hence, unreacted silicon gas travels from the reaction chamber into the gas scrubber through a supply pipe 16.

Supply pipe 16 is glued to a first threaded union 17a, which is in turn threadably engaged to the union nut 17b. Union nut 17b is then threadably engaged to a second threaded union 17c, which is glued to inlet pipe 18. The flow of gas throughout the scrubbing system is illustrated by block arrows 19. O-rings 20 seal the connection between the supply pipe 16, threaded unions 17a and 17c, and the inlet pipe 18. There is only a slight variation between the diameter of the inlet pipe 18 and the coating of water on the inside diameter of the transition tube 24, such that the exhaust gas experiences only a minimal volume change as it flows between the two, resulting in only minimal gas turbulence at the dry-to-wet transition region 25. It should be noted that a wide variety of different unions 17 may be utilized in addition to the arrangement shown above to removably affix the supply pipe 16 to the inlet pipe 18.

The inlet pipe 18 is co-axially positioned within a cylindrically-shaped fluid reservoir 22, which is integrally connected to the upper portion of a transition tube 24. Another O-ring 26 forms a seal between the inlet pipe 18 and the fluid reservoir 22. O-ring 26 prevents fluid, typically water, from escaping the reservoir 22. The water is supplied to the reservoir through fluid inlet port 28 and transferred through annular channel 30 to a plurality of fluid supply jets 32.

The supply jets 32 inject fluid at a high velocity into the cylindrical cavity 34 formed within the reservoir 22. Supply jets 32 are positioned along the reservoir's cavity forming inner walls so as to tangentially inject fluid into the cavity 34 and thereby cause the fluid within the cavity 34 to swirl or spin rapidly. As depicted in FIG. 2, the supply jets 32 are illustrated by a circled dot and a circled cross, which represent the tip and feathers of an arrow, thereby indicating the direction of fluid flow out of and into the page respectively.

Fluid exits the reservoir's cavity 34 through a small transition gap 33 formed between the bottom of the cavity 34, the bottom of the inlet pipe 18 and the top of the transition tube 24. The transition gap 33 is formed so that as fluid 35 exits the cavity 34, it maintains a high rotational velocity as it travels down the length of the transition tube 24. The rotational direction of the fluid in the reservoir's cavity and the transition tube 24 is shown by the directional arrows 36 and 38. By swirling or spinning the fluid in the transition tube, the internal walls of the transition tube may be completely coated with a washing flow of fluid and continuously flushed so as to prevent SiO2 buildup.

Figure 3:
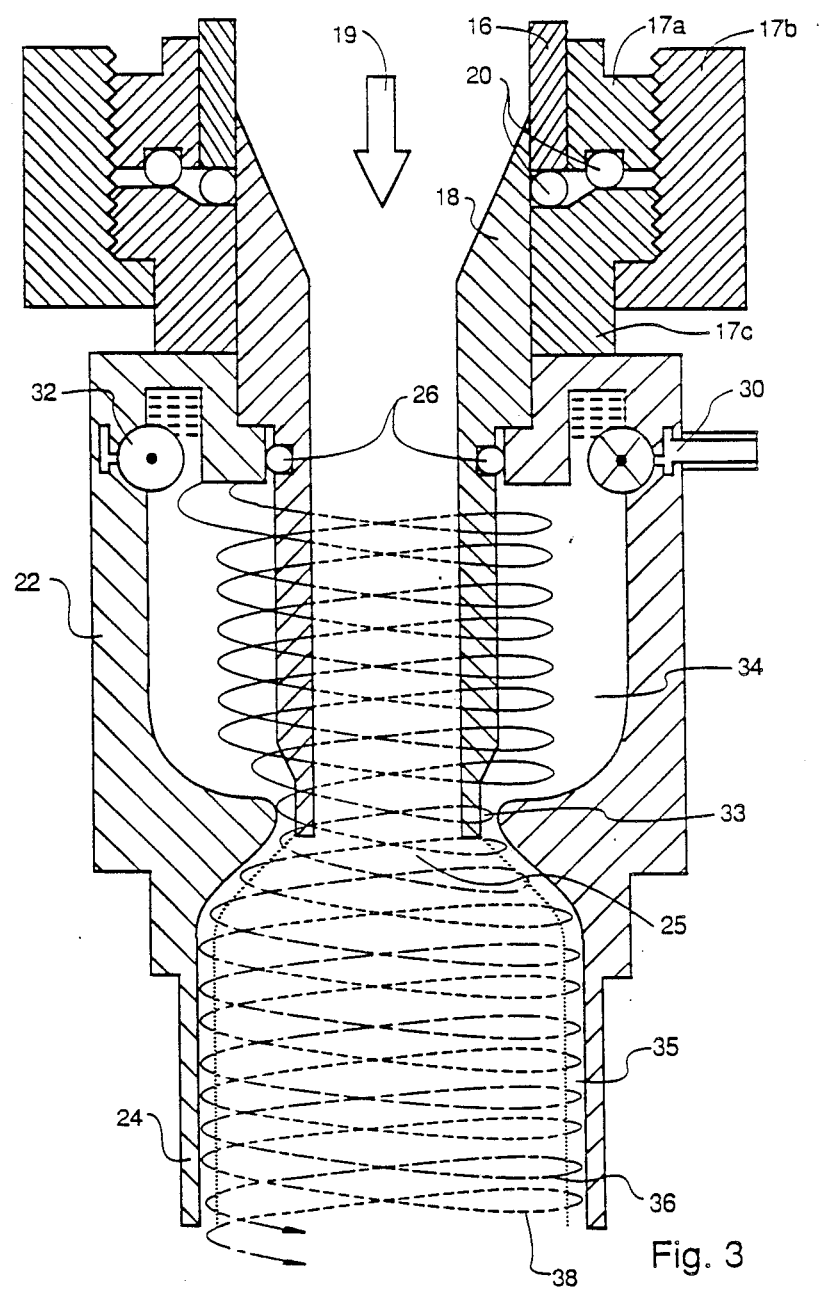
FIG. 3 is a cross-sectional view of an improved scrubber inlet system as shown in FIG. 2 and in accordance with the preferred embodiment of the present invention.

The dry-to-wet transition region 25 of the scrubber inlet system 14 of FIG. 2 is better illustrated with reference now to FIG. 3. FIG. 3 is a partially-broken, cross-sectional view of the inlet pipe 18, reservoir 22 and transition tube 24, further illustrating the transition of the exhaust gas 19 between the dry inlet pipe 18 and the wet transition tube 24. An important feature of the present invention is that this dry-to-wet environment transition is accomplished abruptly. Hence, the unreacted silicon gas 19 makes a quick transition from a dry environment to a totally wet, well-flushed environment without first passing through a region that is not well-flushed and constantly dampened by fluid mist.

A second important feature of the present invention is that the dry-to-wet environment transition is smooth as well as abrupt. This is achieved by making the diameter of the wet transition tube 24 slightly larger than the diameter of the dry inlet pipe 18, such that there is once again only a minimal change in volume between the inlet pipe 18 and the water lining the transition tube 24, resulting in only minimal gas turbulence. The spinning motion of the fluid exiting the cavity 34 also adds to the abrupt but smooth, dry-to-wet transition, because the swirling fluid creates a smoother, substantially mist free, uniform wall of fluid than would be achieved if the fluid was allowed to collect into individual streams. Thus, with regard to the present invention, the abrupt dry-to-wet transition minimizes the formation of stagnant wet surfaces on which SiO2 may collect and the smoothness of that transition reduces the extent of gas turbulence, which can cause fluid mist to be carried back into the dry inlet pipe 18.

With reference now back to FIG. 2, the remainder of the scrubbing system may be described. Since the design of the transition region 25 reduces the quantity of SiO2 which can form within the inlet pipe 18 and transition tube 24, there is a greatly reduced need to shut down the reactor system to remove restrictions in the scrubbing system's gas inlet. Depending on the type of system to which the present invention is compared, the reduction in required maintenance may be as great as ninety percent. However, because the transition will always produce some mist due to evaporation, and the drop in water pressure at the dry-to-wet transition region 25, some SiO2 buildup will occur, eventually leading to the necessary shutdown of the deposition reactor.

With regard to the present invention, the amount of time required to clean restrictions in the inlet pipe 18 is minimal. Inlet pipe 18 sits within and is supported by the reservoir 22 and O-rings 20 and 26. Inlet pipe 18 may be readily removed by unthreading the union nut 17b from the supply pipe 16 and removing the inlet pipe 18 from its O-ring seat. Although it is still necessary to purge the scrubbing system with nitrogen before and after performing maintenance, the amount of maintenance that is required may be accomplished in approximately one minute, thereby reducing the amount of time required to maintain prior art systems from 35 minutes to 21 minutes. At $500.00/hour, this time savings represents a significant overall savings in maintenance costs.

After the gas and fluid have entered the transition tube 24, they flow down the tube until they reach the fluted lower portion of the tube 24, where they enter the scrubbing chamber 12. An additional important feature of the present invention is the interface opening 40 between the transition tube 24 and the scrubbing chamber 12. It should be noted that if the scrubbing chamber is not sufficiently isolated from the dry-to-wet transition region 25, fluid mist from the scrubbing chamber could reach the transition region 25 and still result in SiO2 buildup. Accordingly, the dry-to-wet transition region 25 should be located at one end (the upper end) of the transition tube 24 and the scrubbing chamber 12 should be located at the other end (the lower end) of the transition tube 24.

The interface opening 40 is created by excising (or fluting) a half-cylindrical, lengthwise portion of transition tube 24 from its lower end, so as to allow gas to pass from the transition tube to the initial scrubbing chamber without creating unflushed surfaces in the transition tube or the scrubbing chamber.

Once the gas has reached the scrubbing chamber 12, it travels up through the various stages of the chamber and is released into the environment through exhaust pipe 50. Fluid issuing from the transition tube, as well as the fluid cascading down the internal walls of the scrubbing chamber 12, flows into the collection tank 52, where it is either recirculated or released as sewage water. Within the scrubbing chambers 12 are a number of scrubbing jets 54 and 56. The scrubbing jets are supplied with fluid from fluid supplies 58. The quantity of fluid sprayed by the scrubbing jets within the chamber must be enough to provide a constant and thorough coating of the chamber's walls, so as to prevent SiO2 buildup within the chamber.

Since the gas first entering the scrubbing chamber has the highest concentration of particulate matter, scrubbing jet 54 should provide more fluid for scrubbing than the other scrubbing jets. In addition, the drops of spray produced by scrubbing jet 54 should be large, so that fine mist, which may travel back up the transition tube 24, is kept to a minimum. For instance, a five gallon per minute coarse spray nozzle may be used for scrubbing jet 54, while one gallon per minute fine mist nozzles may be used for the other scrubbing jets. To further reduce the creation of fine mist in the first stage of the scrubbing chamber and improve purging efficiency, a baffle 60 may be provided in between the spray of scrubbing jet 54 and the spray of scrubbing jets 56.

Figure 4:
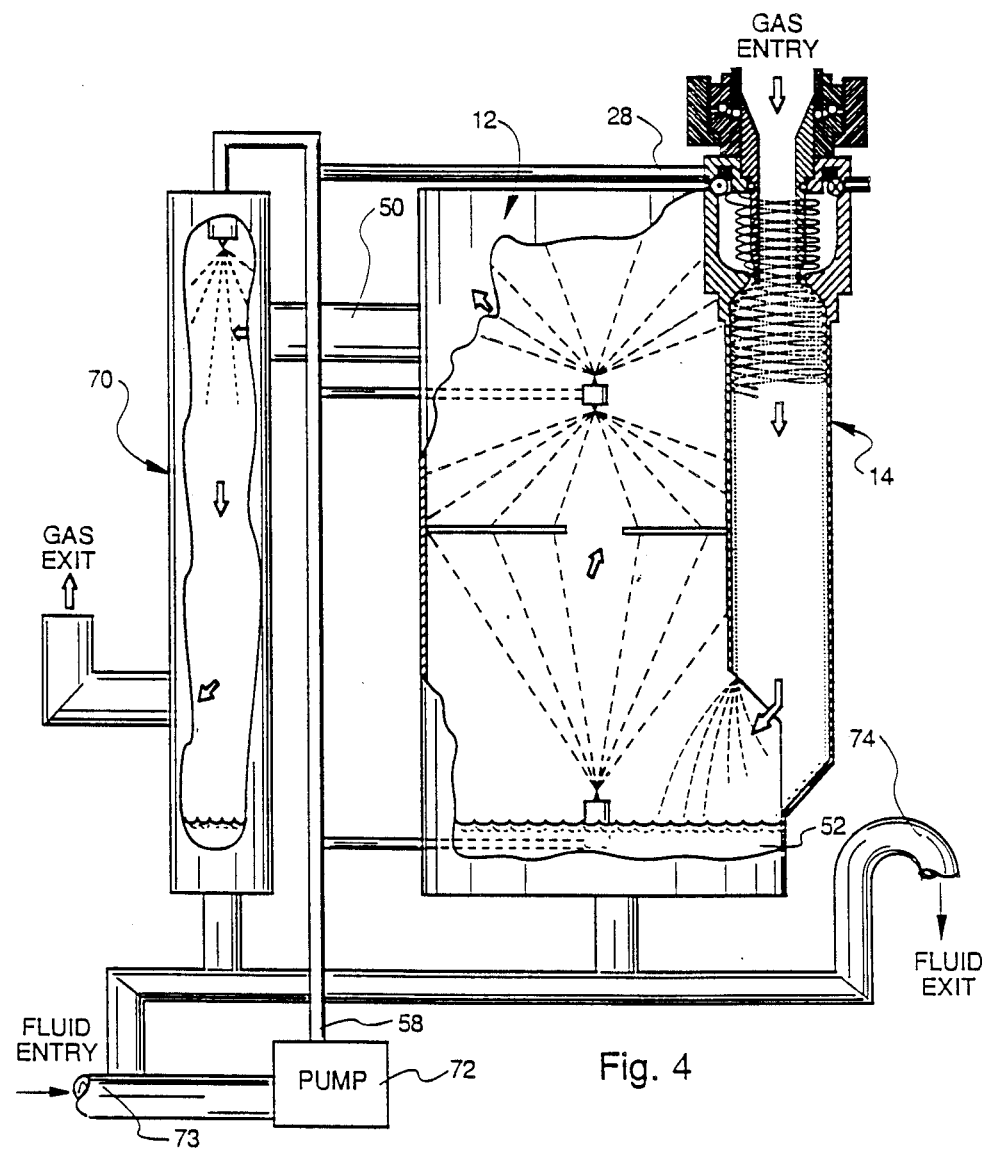
FIG. 4 is a partially-broken, partially cross-sectioned, elevational view of an alternative embodiment of the present invention.

Alternatively, as is depicted in FIG. 4, a third scrubbing chamber 70 could be added to further enhance the scrubbing efficiency of the preferred embodiment of the present invention and to provide for a novel pumping arrangement. In this alternative embodiment, the basic scrubbing chamber 12 and scrubber inlet system 14 are the same as those utilized in the preferred embodiment. The only changes to these elements are that the fluid inlet port 28 is shifted to the opposite side of fluid reservoir 22, and the exhaust pipe 50 is moved from the top of the scrubbing chamber to the side, where it connects to third scrubbing chamber 70.

The third scrubbing chamber 70 has two primary functions. First, it provides additional gas scrubbing to further cleanse the silicon gas being processed by the system. Second, it allows a greater quantity of fluid from the scrubbing chamber to be recirculated for additional use by the system.

As previously mentioned, the highest concentration of unreacted gas flows into scrubbing chamber 12. For this reason, the fluid in collection tank 52 typically has a high degree of acidity and dissolved solids, which tend to lead to rapid aging of the recirculation pump 72. To extend the life span of the recirculation pump 72 and to reduce the requirement for fresh fluid from fluid entry port 73, the drain pipe 74 drains fluid from the highly acidic collection chamber 52 while allowing the less saturated fluid in third scrubbing chamber 70 to be recirculated. Thus, pump 72 is saved from having to process an excessive amount of highly acidic fluid, fresh fluid requirements are reduced and pump life is extended.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. An improved inlet system (14) for a silicon gas scrubber (10) having a well flushed first scrubbing chamber (12) with a first cross sectional area and into which the inlet system (14) communicates, comprising:
    an elongated vertically disposed transition tube (24) having an upper end for receiving particulate carrying gas and a lower end for transferring said gas into said first scrubbing chamber, said lower end having a second cross sectional area substantially smaller than said first cross sectional area such that the velocity of the gases flowing through said transition tube is reduced upon passing out of said lower end;
    means for introducing a substantially mist free swirling flow of washing fluid into said upper end of said transition tube in a manner such that all walls within said transition tube between said upper end and said lower end are thoroughly coated with said washing fluid; and
    an unwetted gas inlet pipe (18) having a discharge end extending into said upper end of said transition tube for introducing said gas into said transition tube, whereby the buildup of particulate from said gas on the walls of said transition tube and said inlet pipe is substantially prevented.

2. An improved inlet system for a gas scrubber as recited in claim 1, wherein said introducing means comprises:
    a fluid reservoir affixed to said upper end of said transition tube and having a substantially cylindrical cavity formed therein; and
    a plurality of fluid supply jets for receiving said fluid from an external source and injecting said fluid into said cavity in such a manner so as to cause said fluid to swirl within said cavity prior to being introduced into said transition tube.

3. An improved inlet system for a gas scrubber as recited in claim 2, wherein said inlet pipe extends through said cavity and is coaxial with respect to said upper end in such a manner so as to create an annular transition gap between said transition tube and said inlet pipe through which said swirling of fluid enters said transition tube.

4. An improved inlet system for a gas scrubber as recited in claim 3, wherein said inlet pipe is removably positioned within said cavity.

5. An improved inlet system for a gas scrubber as recited in claim 3, wherein said inlet pipe is additionally positioned with respect to said upper end such that gas passing from said inlet pipe to said transition tube experiences a smooth and abrupt transition from the substantially dry environment of said inlet pipe to the substantially wet environment of said transition tube.

6. An improved inlet system for a gas scrubber as recited in claim 3, wherein the internal diameter of said inlet pipe is smaller than the internal diameter of said upper end.

7. An improved inlet system for a gas scrubber as recited in claim 1, wherein said upper end is physically distanced from said lower end sufficient to prevent mist from said scrubbing chamber from reaching said upper end.

8. An effluent silicon gas scrubber comprising:
    means forming a first scrubbing chamber (12) having a first cross sectional area for receiving gas laden with particulate matter and including means (54) for spraying said gas with a scrubbing fluid in such a manner as to cause said particulate matter to be separated from said gas and deposited in a first collection reservoir (52) at the bottom of said first scrubbing chamber;
    an elongated transition tube (24) having an upper end for receiving said gas and a lower end for transferring said gas into a lower portion of said first scrubbing chamber (12), said lower end having a second cross sectional area substantially smaller than said first cross sectional area such that the velocity of gases flowing through said transition tube is reduced upon passing out of said lower end and into said scrubbing chamber;
    means for introducing a substantially mist free swirling flow of washing fluid into said upper end of said transition tube in a manner such that all walls within said transition tube between said upper end and said lower end are thoroughly coated with said washing fluid;
    a gas inlet pipe (18) having a discharge end extending into said upper end of said transition tube for introducing said gas into said transition tube in a manner such that the buildup of particulate matter from said gas between said transition tube (24) and said inlet pipe (18) is substantially prevented;
    means forming a second scrubbing chamber (70) for receiving said gas from said first scrubbing chamber, and means for further spraying said gas with scrubbing fluid in such a manner as to cause additional particulate matter to be separated from said gas and deposited in a second collection reservoir at the bottom of said second scrubbing chamber, and means for releasing cleansed gas into the atmosphere; and
    pumping means (72) for withdrawing collected fluid from said first and second collection reservoirs in such a manner as to discharge collected fluid contaminated by said particulate matter and to recirculate collected fluid less heavily contaminated by said particulate matter to said introducing means and said first and second scrubbing chambers.

9. An effluent silicon gas scrubber as recited in claim 8, wherein said pumping means comprises a recirculating pump for receiving fresh fluid from a fluid supply port and less heavily contaminated collected fluid withdrawn from said first and second collection reservoirs and supplying a combination of said fresh fluid and less heavily contaminated collected fluid to said introducing means and said first and second scrubbing chambers.

10. An effluent silicon gas scrubber as recited in claim 9, wherein said pump withdraws a majority of said collected fluid from said second collection reservoir, and wherein a majority of said collected fluid from said first collection reservoir is discharged to a post-processing system for cleansing particulate matter from said collected fluid.

11. An effluent silicon gas scrubber as recited in claim 10, wherein said first scrubbing chamber sprays non-atomized cleansing fluid at a rate greater than one gallon per minute.

12. In an effluent gas scrubber system including an inlet system (14) for receiving particulate carrying gas from an inlet port and inputting the gas into a scrubbing chamber (12) having a first cross sectional area for receiving said gas and cleansing said gas with a scrubbing fluib before it is released into the atmosphere, an improved inlet system (14), comprising:
    an elongated transition tube (24) having an upper end for receiving said gas and a lower end for transferring said gas into said scrubbing chamber, said lower end having a second cross sectional area substantially smaller than said first cross sectional area such that the velocity of gases flowing through said transition tube is reduced upon passing out of said lower end;
    means (22) for introducing a substantially mist free swirling flow of washing fluid into said upper end of said transition tube in a manner such that all walls within said transition tube between said upper end and said lower end are thoroughly coated with said washing fluid; and
    a gas inlet pipe (18) having a discharge end extending through said introducing means (22) and into said upper end of said transition tube for receiving said gas from said inlet port and introducing said gas into said transition tube in a manner such that the buildup of particulate from said gas on the walls of said transition tube and said inlet pipe is substantially prevented.

13. An improved inlet system for a gas scrubber as recited in claim 12, wherein said introducing means comprises:
    a fluid reservoir affixed to said upper end of said transition tube and having a substantially cylindrical cavity formed therein; and
    a plurality of fluid supply jets for receiving said fluid from an external source and injecting said fluid into said cavity in such a manner so as to cause said fluid to swirl within said cavity prior to being introduced into said transition tube.

14. An improved inlet system for a gas scrubber as recited in claim 13, wherein said inlet pipe is co-axially positioned within said cavity and with respect to said upper end in such a manner so as to create an annular transition gap between said transition tube and said inlet pipe through which said swirling flow of fluid enters said transition tube.

15. An improved inlet system for a gas scrubber as recited in claim 14, wherein said inlet pipe is removably positioned within said cavity.

16. An improved inlet system for a gas scrubber as recited in claim 14, wherein said inlet pipe is additionally positioned with respect to said upper end such that gas passing from said inlet pipe to said transition tube experiences a smooth and abrupt transition from the substantially dry environment of said inlet pipe to the substantially wet environment of said transition tube.

17. An improved inlet system for a gas scrubber as recited in claim 14, wherein the internal diameter of said inlet pipe is slightly smaller than the internal diameter of said upper end.

18. An improved inlet system for a gas scrubber as recited in claim 14, wherein said lower end of said transition tube is fluted, thereby minimizing unflushed surfaces within said transition tube and said scrubbing chamber.

19. An improved inlet system for a gas scrubber as recited in claim 12, wherein said upper end is physically distanced from said lower end sufficient to prevent mist from said scrubbing chamber from reaching said upper end.

* * * * *